United States Patent [19]

Kimura

[11] 4,398,434
[45] Aug. 16, 1983

[54] FORCE-SAVING HIGH SPEED PEDAL

[76] Inventor: Senkichiro Kimura, 4-14-23, Shiratori, Katsushika-ku, Tokyo, Japan, 125

[21] Appl. No.: 357,666

[22] Filed: Mar. 12, 1982

Related U.S. Application Data

[63] Continuation of Ser. No. 141,211, Apr. 17, 1980, abandoned.

[30] Foreign Application Priority Data

Mar. 12, 1980 [JP] Japan .................................. 55/30288

[51] Int. Cl.³ ............................................. G05G 1/14
[52] U.S. Cl. .................................... 74/594.4; 192/45
[58] Field of Search .......................... 74/594.4; 192/45

[56] References Cited

U.S. PATENT DOCUMENTS 1,228,673  6/1917  Hribar .................................. 192/45

FOREIGN PATENT DOCUMENTS 953854  12/1949  France ............................. 74/594.4
173597  11/1934  Switzerland ..................... 74/594.4

Primary Examiner—Kenneth Dorner
Attorney, Agent, or Firm—Wenderoth, Lind & Ponack

[57] ABSTRACT

The fundamental principle of this invention is based on the fact that the moment of force or torque is equal to the product of a force and a distance through which the force acts from the fulcrum. The pedal of a bicycle comprises a pair of freely rotatable treads together with a pair of inner and outer plates around a spindle connected to a crank, the spindle, a center tube covering the spindle, and minor parts. The force of man's leg onto the pedal per unit time can be conserved or increased by securing one of the rotatable treads to the spindle by means of a one-way clutch means provided in the space between center tube and spindle in order to enlarge the distance from the fulcrum to the point of action of the force.

3 Claims, 11 Drawing Figures

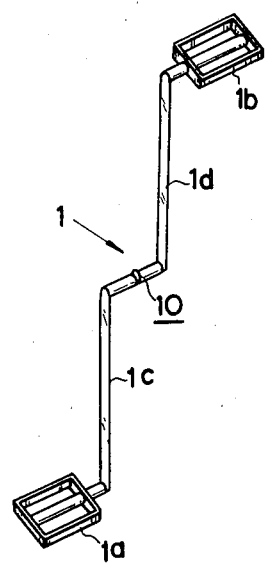
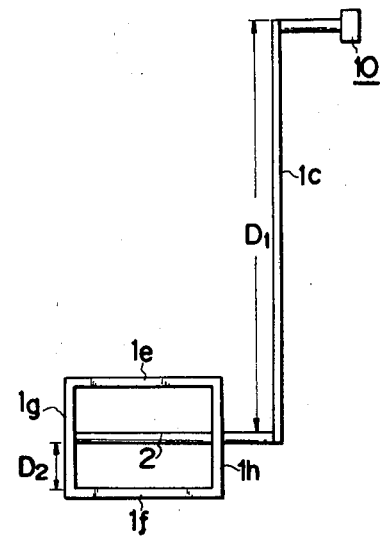
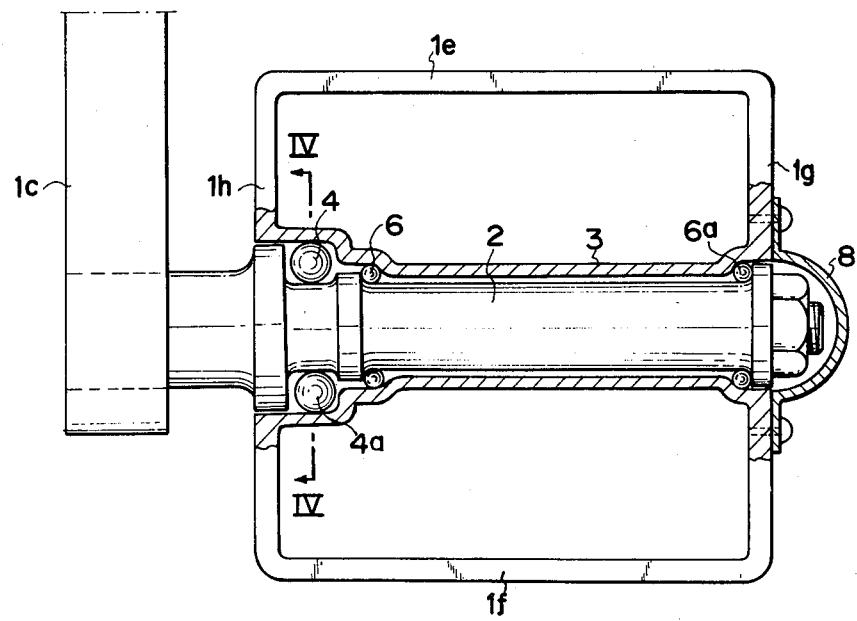

4,398,434

FORCE-SAVING HIGH SPEED PEDAL

This is a Rule 60 Continuation of Ser. No. 141,211, filed Apr. 17, 1980, now abandoned.

BACKGROUND OF THE INVENTION

The present invention relates to a driving pedal of a bicycle which drives a chain gear, more particularly to a force-saving pedal which increases the efficiency of the force of action of man's leg acting on the pedal by enlarging a distance through which the force acts from the fulcrum to the point of action of the force on the pedal on the recognition that the moment of force or torque is the product of a force and its distance through which the force acts.

In general, the known pedal of the bicycle comprises a spindle connected to a crank, a center tube which covers the spindle, a pair of treads, and inner and outer plates which support the treads.

Minor improvements, such as, reflector provided at the side of the tread, have been proposed, but it seems that few noteworthy innovation in connection with the pedal itself have been introduced in recent years.

It is also known that the treads of the pedal together with the plates are freely rotatable in either direction on the spindle. Heretofore nobody has ever cast any doubt on the known construction of the pedal.

I, the inventor, have seen many improvements relating to the bicycle for more than half a century since I entered the bicycle industry, and I have invented the force-saving high speed pedal in accordance with the invention in view of the present state of the pedal together with the present age of energy-saving.

SUMMARY OF THE INVENTION

Accordingly, it is one object of the present invention to provide a novel pedal which may be manufactured at a relatively low cost utilizing the present day mechanical techniques and which nevertheless provides a high degree of practical value.

It is another object of the invention to provide a simple and powerful pedal which nevertheless attains a high degree of human energy savings.

It is yet another object of the invention to provide a novel pedal requiring very few mechanical parts.

It is still another object of the invention to provide a relatively inexpensive bicycle for a fatigue-free long distance cycling tour.

The invention which satisfies the above and other objects (as will become more clear from the appended drawings and detailed description) may be briefly summarized as a pedal whose rotatable tread is secured to the spindle of the pedal by means of a one-way clutch means when the pedal is driven in the progress direction of a bicycle in order to elongate the distance through which the force acts and conserve or increase the force of man's leg onto the pedal based on the principle that the force acting on the pedal per unit time is equal to the product of the force and its distance through which the force acts.

In a first described embodiment, a one-way clutch comprises the combination of a center tube of the pedal, a plurality of steel balls, and a spindle, the inside surface of the center tube being provided with a groove designed to contain the plurality of steel balls in the space between center tube and spindle.

In a second disclosed embodiment, a one-way clutch of a known commercial product is disposed in the space between center tube and spindle.

BRIEF DESCRIPTION OF THE DRAWINGS

For a more thorough understanding of the nature of the present invention and how it may be best practiced by one skilled in the art, reference is made to the following detailed description and the appended figures in which:

FIG. 1 is a schematic diagram of the pedal system of a bicycle.

FIG. 2 is a schematic diagram of one pedal together with its accessories.

FIG. 3 is a sectional view of the one pedal showing in detail how the one-way clutch means of this invention is installed.

DETAILED DESCRIPTION OF PREFERRED EMBODIMENTS

Figure 4:
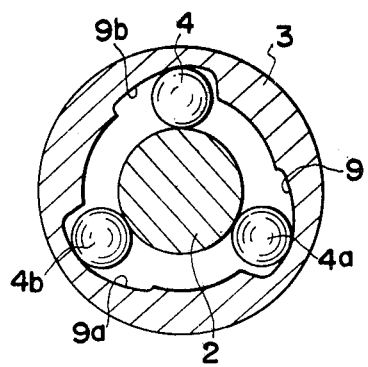
FIG. 4 is a sectional view of the one-way clutch means along the line IV—IV of FIG. 3.

Referring more specifically to the schematic diagram of FIG. 1, the bicycle is provided with a pedal system 1 comprising a pair of pedals 1a, 1b at either side of a hanger lug or bottom bracket bearing axle 10 from which left and right cranks 1c, 1d extend at right angles thereto in linear, yet opposite directions, and each pedal is connected at right angles to both cranks, respectively.

In FIG. 2 showing one pedal in a schematic diagram, the pedal 1a comprises a pair of treads 1e, 1f, inner and outer plates 1g, 1h, and a spindle 2. The treads 1e, 1f are usually covered with rubber, and they are sometimes provided with a reflector at the side thereof, respectively. The treads 1e, 1f together with the inner and outer plates are rotatably mounted on the spindle 2 connected at the right angle to one end of the crank 1c whose length or distance $D_1$ is shown.

The length $D_2$ of half the outer or inner plate 1g or 1h is also shown.

As described hereinbefore, the fundamental principle of the invention is based on the fact that the moment of force or torque is equal to the product of a force and a distance through which the force acts. In other words, to find the amount of work we do in doing any task, we multiply our force by the distance through which it acts.

In general, the distance through which the force of man's leg acts onto the pedal is equal to the length $D_1$ of the crank $1c$ as shown in FIG. 2. In accordance with the invention, however, the distance through which the force of man's leg acts onto the pedal is enlarged by adding a distance $D_2$, half the length of the outer or inner plate $1g$ or $1h$ of the pedal (FIG. 2), to the above distance $D_1$.

Thus the total distance $D_1+D_2$ can be utilized to advantage. Accordingly, it follows that the efficiency of force of man's leg which acts on the pedal can be increased significantly conserved.

To satisfy the above requirement in accordance with the first disclosed embodiment, a one-way clutch mechanism is disposed in the void or space between center tube 3 and spindle 2 as clearly shown in FIG. 3 in which a sectional view of a typical pedal with spindle 2, center tube 3, a pair of treads $1e$, $1f$, outer plate $1g$, inner plate $1h$, ball bearings 6, $6a$, steel balls 4, $4a$ for the one-way clutch, dust cover 8, and crank $1c$ are illustrated in a schematic diagram. It is known that the treads $1e$, $1f$ together with the plates $1g$, $1h$ are freely rotatably mounted on the spindle 2.

The bearings 6, $6a$ are provided so as to allow free and smooth rotation.

An essential feature of this invention lies in the tread of the pedal being firmly fixed to the spindle in the progress direction of the bicycle, namely, both the tread and the spindle are converted into an integral unit, and subjected to the action of the force of a man's leg. In other words, the action point of the leg force is transferred from the spindle, middle part of the pedal to the foremost part, tread by the distance $D_2$, hence an effective distance is so increased that it will be able to conserve or increase the force of the leg.

Referring more particularly to the above, the rotary force or torque of the pedal connected to the crank $1c$ mounted on the axle of the hangle lug 10 is the product of the leg force and the distance through which the force acts. To increase the rotary force or torque, either the length of the crank ($D_1$) or the leg force may be increased, and or both may be increased. However, if the length of the crank is increased, the increased crank may touch the road surface. In particular, when the bicycle turns around the corner, the long crank may touch the road surface. Furthermore, the human leg force may be limited on account of fatigue.

In general, the length of the crank of the present day bicycle is in the range of 150 to 180 mm, while the distance between spindle and tread is in the range of 30 to 35 mm. Accordingly, the distance through which the leg force acts may be enlarged or elongated by an additional distance $D_2$, namely, 30 to 35 mm. Thus, the total effective distance through which the force acts is the sum of $150+30=180$ mm. to $180+35=215$ mm. Hence we can obtain the rate of increase in connection with the effective distance in the order of about 20%, which is obtained from the division 30/150 to 35/180. In other words, the efficiency thus increased is in the order of about 20% under the same requirements, same bicycle, and same rider.

In general, when a rider runs his bicycle at a speed of 18 km. an hour on the level road surface under calm conditions, it is known that the force of man's leg which acts on the pedal is about 0.1 horsepower or converted to about 9 kg. Provided that the force of leg acting on the pedal is 9 kg. under the above condition, and the efficiency is also increased by 20% in accordance with the preferred embodiment of the invention, the force acting on the pedal is reduced to 7.2kg. as follows: $9-(9\times0.2)=7.2$ kg.

Therefore the force of man's leg of about 9 kg. required for the pedal of prior art is decreased to about 7.2 kg. in this invention. Namely, the rider can drive the pedal much more lightly and easily so that he feels less fatigue during a long distance cycling tour.

In FIG. 3, steel balls 4, $4a$ are so inserted into each groove (see grooves 9, $9a$, $9b$ of FIG. 4) provided on the inside surface of the center tube 3 that the steel ball together with the groove cooperate each other to function as a one-way clutch mechanism which is known in the mechanical industry. Of course, the left and right pedals are entirely the same.

In FIG. 3, there are shown the spindle 2, the center tube 3 which covers the spindle 2, a dust cover 8 connected to the outer plate $1g$, ball bearing 6, $6a$ to allow the free rotation of the center tube 3 around the spindle 2, treads $1e$, $1f$ and inner and outer plates $1g$, $1h$ connected together to the center tube 3. The treads, plates and center tube are all rotatably mounted on the spindle, which is firmly connected to the crank $1c$. Other minor parts are omitted.

The one-way clutch feature of this invention is shown in FIG. 4. FIG. 4 is a section along the line IV—IV of FIG. 3. Three steel balls 4, $4a$, $4b$ are disposed in the space between spindle 2 and center tube 3, and they fit in the grooves 9, $9a$, $9b$, respectively. Each groove is so designed that the size and depth thereof are made gradually smaller from one end to the other in the progress direction of the cycle so as to make the steel ball to stop in the groove when the bicycle progresses. The one-way clutch transmits no torque between spindle and center tube in one direction, namely, in the progress direction, but allows free overrun or rotation in the opposite direction, namely, when the pedal does not work in the progress direction of the bicycle.

Thus the center tube 3 is firmly fixed to the spindle 2 so that both treads $1e$, $1f$ secured to the inner and outer plates $1g$, $1h$ and also to the center tube 3 are firmly fixed to the spindle 2. As a result, the pedal comprising center tube 3, spindle 2, treads $1e$, $1f$, and plates $1g$, $1h$ is an integral unit. Therefore the force of man's leg acts on the whole pedal including the foremost tread with the advantage that the total distance through which the force acts can be elongated by the distance $D_2$ (FIG. 2). We can thus obviate the disadvantage that the force does not act on either tread of the pedal of prior art, but particularly acts only on the spindle of the pedal.

Figure 5:
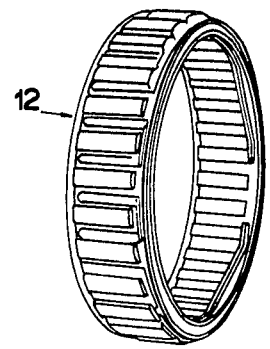
FIG. 5 is a perspective view of a one-way clutch of a known commercial product of Nippon Seiko Co., Ltd. (NSK), Japan.

In the second disclosed embodiment, a one-way clutch product of FIG. 5 is applied. The one-way clutch product of FIG. 5 is a known product commercially available under the license agreement of Borg Warner Corporation, U.S.A. and Nippon Seiko Co., Ltd. (NSK), Japan, and good results have been obtained from the application of the product to the pedal as the one-way clutch in accordance with the invention. The one-way clutch product of NSK is disposed in the space between center tube and spindle. However, the one-way clutch means of FIG. 4 is different from the one of FIG. 5 in that the former comprises the center tube 3 having a plurality of grooves in its inside surface, a plurality of steel balls, and the outside surface of the spindle 2 while the latter is a commercial product of a ready-made type.

Figure 6:
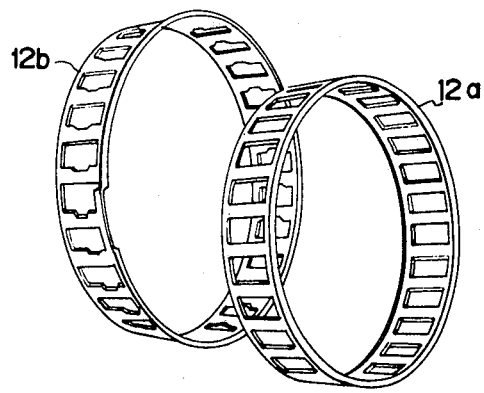
FIG. 6 shows the outer and inner retainers of the one-way clutch of FIG. 5.
Figure 7:
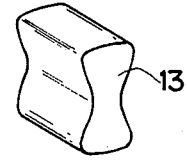
FIG. 7 is a perspective view of one of sprags retained by the retainers.
Figure 8:
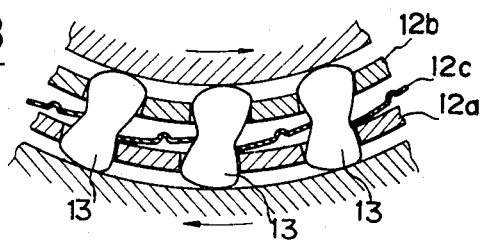
FIG. 8 is a sectional view of the one-way clutch of FIG. 5 showing how it allows free overrun or rotation in one direction.
Figure 9:
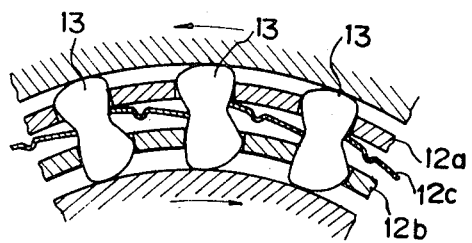
FIG. 9 is a sectional view of the one-way clutch showing it inhibits the rotation in the opposite direction.

An essential element of the one-way clutch 12 is a sprag 13 shown in FIG. 7. As shown in FIGS. 8-9 which illustrate how the sprags work, the four corners of each sprag are characterized by the special configuration of forms. According to the special form, the one-way clutch having sprags transmits no torque between spindle 2 and center tube 3 in one direction or progress direction of the bicycle, and allows free overrun or rotation in the opposite direction. Regarding the detailed information of the one-way clutch product manufactured by NSK, reference is made to the catalog Pr. No. 1504 (1979) published by NSK. In summary, the sprag 13 is retained by an outer retainer 12a, inner retainer 12b, and a ribbon spring 12c shown in FIG. 6 and FIGS. 8-9.

Figure 10:
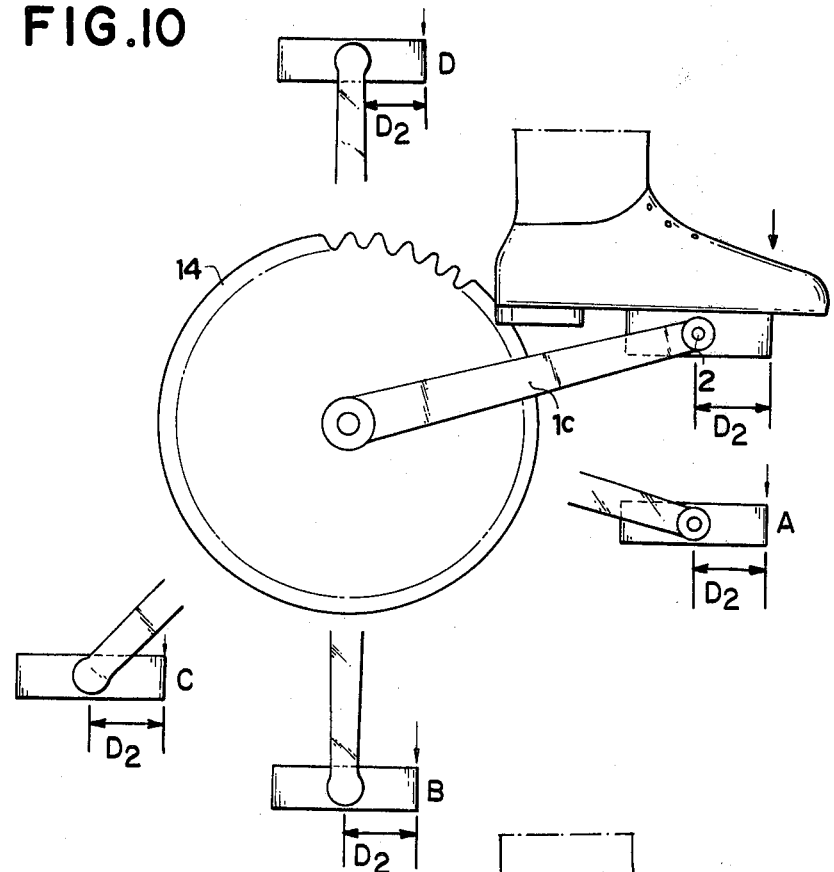
FIG. 10 is a side view showing two points on which the force of man's leg is applied, one point being applied by the conventional pedal while the other point by the novel pedal of this invention. The novel point of applying force moves from the initial position to the D position via A, B, and C positions.

FIG. 10 is a side view showing the difference in the point of action of the force onto the pedal between the novel pedal of this invention and the conventional one of prior art. It illustrates that the point of action of the force onto the conventional pedal lies in the spindle alone while, on the contrary, the point of action of the force onto the pedal of this invention lies in the position moved by the distance $D_2$. Furthermore, the point of action of the force onto the pedal in this invention is always constant no matter how the pedal moves from the position A to the position D via B and C positions.

Figure 11:
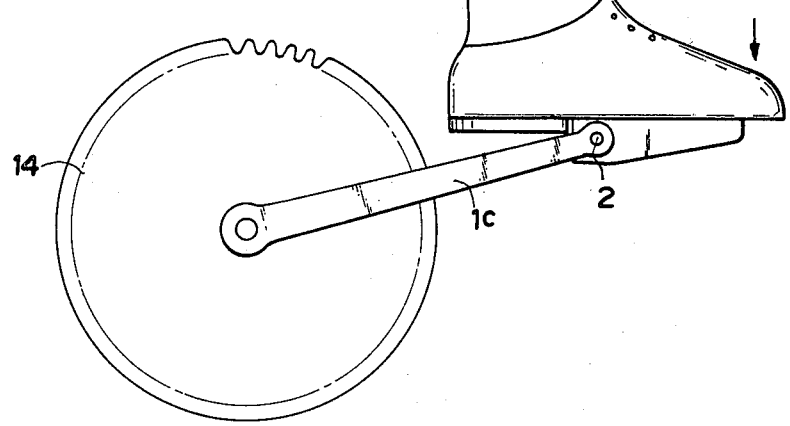
FIG. 11 is a side view showing a novel pedal modified in accordance with the principle of the invention. The modified pedal comprises one tread, center tube, spindle, and one-way clutch as clearly shown in the drawing.

FIG. 11 shows a side view of a pedal modified in accordance with the invention wherein one of the treads 1e, 1f is removed or omitted, namely, a modified pedal having an only tread. It is understood that the one-tread pedal provided with the one-way clutch of this invention or of a commercial product will be used to advantage.

As fully described in the foregoing, the force-saving pedal of the present invention is able to increase or save the force of the bicycle rider in the order of about 20%, hence the novel pedal of this invention should be a noteworthy one in the present energy-saving age.

Although the invention has been described in detail with reference to two embodiments, it should be appreciated that the scope of the invention should be determined solely with reference to the following appended claims.

What is claimed is:

1. A bicycle pedal of high mechanical advantage comprising a spindle adapted to be connected to a crank, a center tube covering said spindle, inner and outer plates attached to said center tube perpendicularly thereto and inner and outer treads connecting the plates at their outer edges, said treads being parallel to said spindle, said spindle having at least one bearing race, said center tube having a plurality of arcuate grooves on the inner surface thereof, said grooves being in a single plane between said inner and outer plates and said plane being perpendicular to the axis of said center tube, each of said grooves having a ball bearing therein, the depth of the arc of said grooves becoming gradually smaller and narrower than the size of said ball bearing in the clockwise direction from one end of said groove to the other and thereof to form a one-way clutch by said bearings being wedged between said spindle and said arcuate grooves, whereby said pedal is prevented from rotation in the clockwise direction and is freely rotatable in the counter-clockwise direction.

2. The pedal according to claim 1 wherein said one-way clutch is adjacent said inner plate.

3. The pedal according to claim 1 or 2 wherein the outer tread is further from the spindle than the inner tread to increase the distance from the fulcrum of said pedal to the point of action of the force applied to said pedal.

* * * * *